(12) United States Patent
Kimoto et al.

(10) Patent No.: US 7,805,055 B2
(45) Date of Patent: Sep. 28, 2010

(54) RECORDER

(75) Inventors: Yousuke Kimoto, Kanagawa (JP); Tomokazu Kake, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1129 days.

(21) Appl. No.: 11/109,461

(22) Filed: Apr. 19, 2005

(65) Prior Publication Data

US 2005/0232592 A1    Oct. 20, 2005

(30) Foreign Application Priority Data

Apr. 20, 2004    (JP)    ............. 2004-124602

(51) Int. Cl.
*H04N 5/76*    (2006.01)
*H04N 7/00*    (2006.01)

(52) U.S. Cl. ......................... 386/83; 386/46
(58) Field of Classification Search ............ 386/1, 386/45–46, 83, 125–126
See application file for complete search history.

(56) References Cited

U.S. PATENT DOCUMENTS

| | | | |
|---|---|---|---|
| 6,311,011 B1 * | 10/2001 | Kuroda ................. | 386/46 |
| 7,054,697 B1 * | 5/2006 | Nishiwaki et al. ....... | 700/94 |
| 7,092,614 B2 * | 8/2006 | Liebhold et al. ........ | 386/46 |
| 2002/0191954 A1 * | 12/2002 | Beach et al. ........... | 386/46 |
| 2005/0204388 A1 * | 9/2005 | Knudson et al. ........ | 725/58 |

FOREIGN PATENT DOCUMENTS

| | | |
|---|---|---|
| JP | 10-200791 | 7/1998 |
| JP | 2002-135704 | 5/2002 |
| JP | 2002-330420 | 11/2002 |
| JP | 2003-333485 | 11/2003 |

OTHER PUBLICATIONS

Notification of Reasons for Rejection dated May 19, 2009, from the corresponding Japanese Application.

* cited by examiner

*Primary Examiner*—Thai Tran
*Assistant Examiner*—Nigar Chowdhury
(74) *Attorney, Agent, or Firm*—Katten Muchin Roseman LLP

(57) ABSTRACT

In order to record a program provided by a program broadcasting device, a recorder (5) that receives program identifying information provided by a program information providing device to record the program includes: a program identifying information detector (10) for detecting the program identifying information at least at one timing of start, duration, and end of the broadcasted program; and a recording operation controller (20) for controlling recording operation based on a detection result of the program identifying information detector (10). The recording operation controller (20) includes: a recording start/end determining section (21) for staring and/or ending the recording operation based on the detected program identifying information; and a recorded program determining section (22) for determining the program being recorded based on the program identifying information detected while the program is recorded.

3 Claims, 5 Drawing Sheets

RECORDER

BACKGROUND OF THE INVENTION

1. Field of the Invention

The present invention relates to a recorder that receives a program broadcasted by a program broadcasting device for broadcasting programs in accordance with a predetermined time schedule and program information provided by a program information providing device for providing information regarding the program broadcasted by the program broadcasting device, and records the program based on the program information.

2. Description of Related Art

Conventionally, in setting timer-recording of television (hereinafter abbreviated as TV) programs or the like, it has been required for a user to check a broadcast time and channel on TV schedule in a newspaper or the like, set the broadcast time by way of a built-in timer in a recorder such as video recorder, DVD/HD recorder, and set the broadcasting channel.

However, such method requires a user to operate an operation terminal such as a remote controller for setting, which makes the setting operation troublesome.

Thus, with recent diffusion of digital broadcasting, there have been realized timer-recording methods enabling a user to set on a TV screen through an EPG (Electronic Program Guide), and further, to set from a remote place with the use of a recorder and a terminal such as PDA that can be connected to internet even when the user is away from the recorder (see, for instance, Reference: JP2002-135704A, [0002] and [0003]).

Since such timer-recording methods enable a user to set timer-recording with an easy operation on the screen, the methods have been widely diffused with their high convenience.

However, in the conventional timer-recoding methods including the one disclosed in the Reference, a trigger for starting recording is set time of the built-in timer, so that timer-recording cannot be accurately started if the set time of the built-in timer differs from time in a broadcasting station. In a live broadcasting of baseball game or the like, the broadcast time is likely extended depending on progress of the game, which delays starting times of following programs, and thus if a program after the live broadcasting is set for timer-recording, the desired program cannot be properly recorded.

SUMMARY OF THE INVENTION

An object of the present invention is to provide a recorder capable of recording a desired program accurately and completely.

According to an aspect of the present invention, a recorder that receives a program broadcasted by a program broadcasting device for broadcasting program in accordance with a predetermined time schedule and program identifying information provided by a program identifying information providing device for providing information to identify the program broadcasted by the program broadcasting device and records the program based on the program identifying information includes: a program identifying information detector for detecting the program identifying information at least at one timing of start, duration, and end of the program broadcasted by the program broadcasting device; and a recording operation controller for controlling recording operation based on a detection result of the program identifying information detector, in which the recording operation controller includes: a recording start/end determining section for starting the recording operation and/or ending the recording operation based on the detection result of the program identifying information detector; and a recorded program determining section for determining the program currently being recorded based on the detection result of the program identifying information detector while the program is recorded.

DETAILED DESCRIPTION OF PREFERRED EMBODIMENT(S)

An embodiment of the present invention will be described with reference to the attached drawings.

Figure 1:
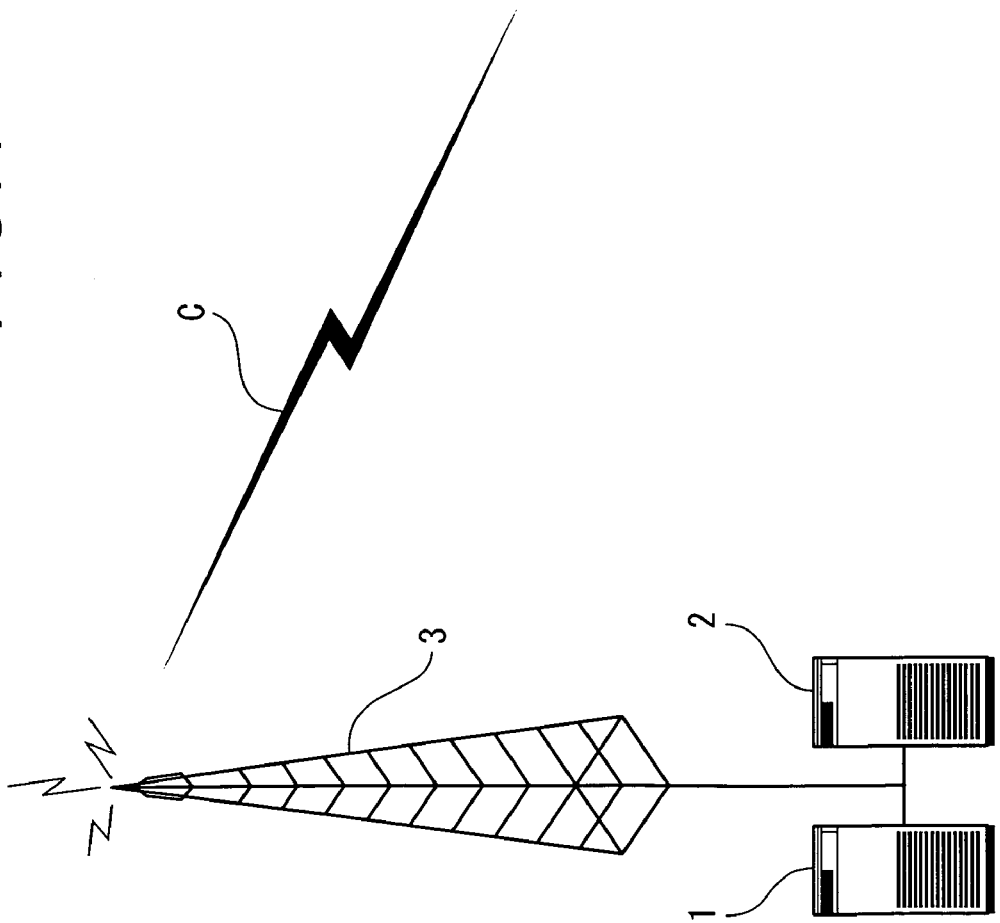
FIG. 1 is a schematic illustration showing an arrangement of a program broadcasting system according to an embodiment of the present invention.

FIG. 1 shows a digital terrestrial broadcasting system according to the embodiment of the present invention. The digital terrestrial broadcasting system includes a content distributing device 1 as a program broadcasting device, a content information distributing device 2 as a program information providing device, an antenna 3 for outputting radio wave, a TV set 4 and a hard disk recorder 5 as a recorder.

The content distributing device 1 broadcasts and distributes programs according to a predetermined time schedule, more specifically, distributes various programs created by program creators in accordance with a distribution schedule set by a broadcasting station.

Although described later in detail, the content information distributing device 2 distributes a program ID as a program identifier showing a program in distribution, status information of the program and program identifying information (e.g. information of changes of the distributed program) added to the distributed program.

The program broadcasted by the content distributing device 1 and the program identifying information provided by the content information distributing device 2 are integrated through an editing/synthesizing device (not shown) located between the antenna 3 and the distributing devices, and then output wirelessly as distribution information from the antenna 3 by an encoded carrier wave, so that the program is reproduced and the program identifying information is recognized by the TV set 4 of a subscriber who has subscribed for the digital broadcasting.

The TV set 4 is a device to display an image content distributed from the broadcast station on a display, which may employ various display systems such as CRT display and FPD.

Figure 2:
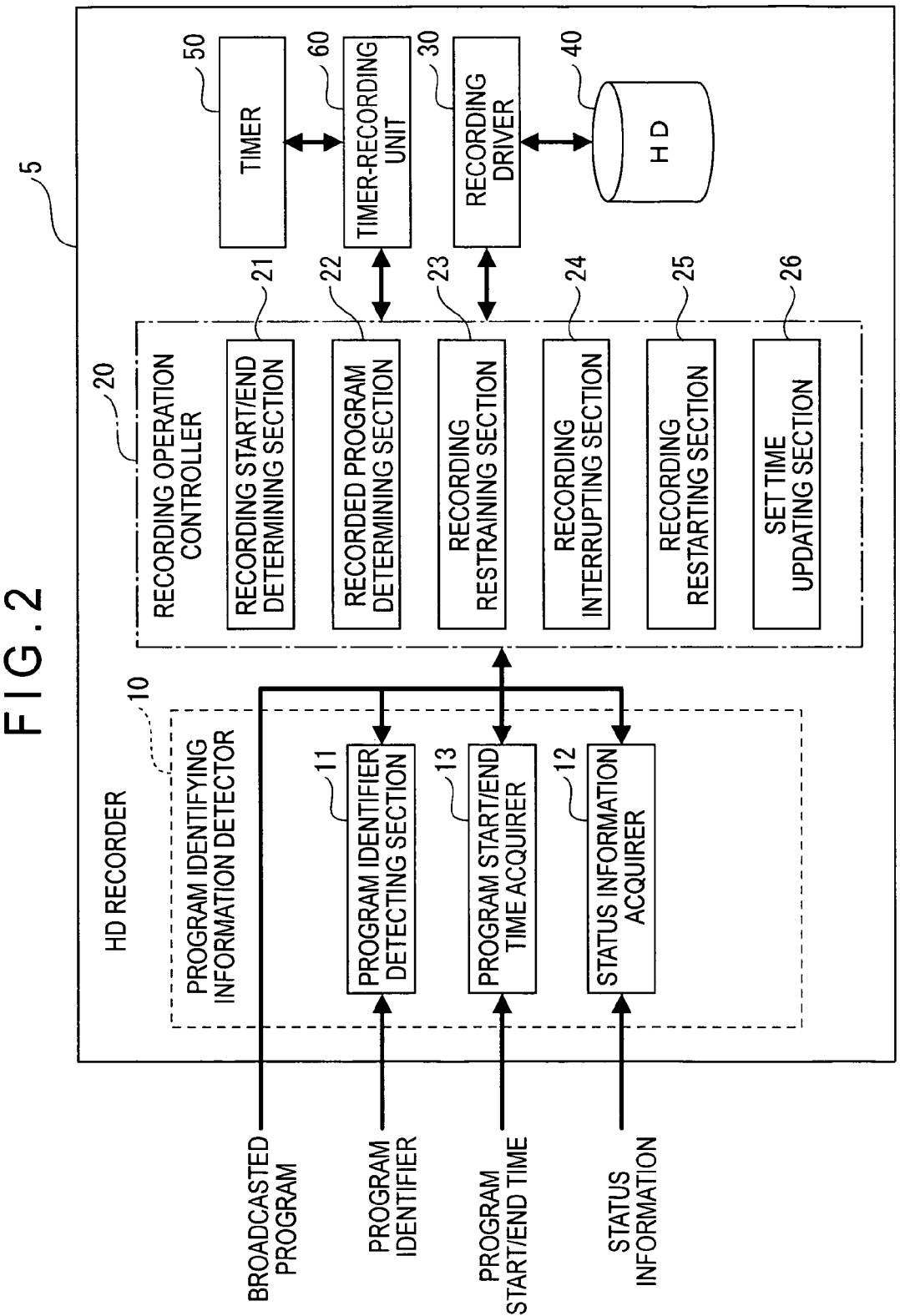
FIG. 2 is a schematic illustration showing an arrangement of a recorder according to the embodiment.

The hard disk recorder 5 records a received distribution content in accordance with a need of a user. More specifically, as shown in FIG. 2, the hard disk recorder 5 includes a program identifying information detector 10, a recording operation controller 20, a recording driver 30, a hard disk 40, a timer 50 and a timer-recording unit 60. The timer 50 is a built-in timer, and the timer-recording unit 60 is a circuit for a versatile timer-recording employed in this type of recorder. Although not shown, the hard disk recorder 5 further includes a recording/reproducing unit for an optical disc such as DVD, so that program data recorded in the hard disk 40 can be recorded and stored in the optical disc when needed.

The program identifying information detector 10 performs decoding and analog-digital conversion on the encoded carrier wave C output by the antenna 3 to detect information included in the program identifying information in the carrier wave C, the detector 10 including a program identifier detecting section 11, a status information acquirer 12, and a program start/end time acquirer 13.

Figure 3:
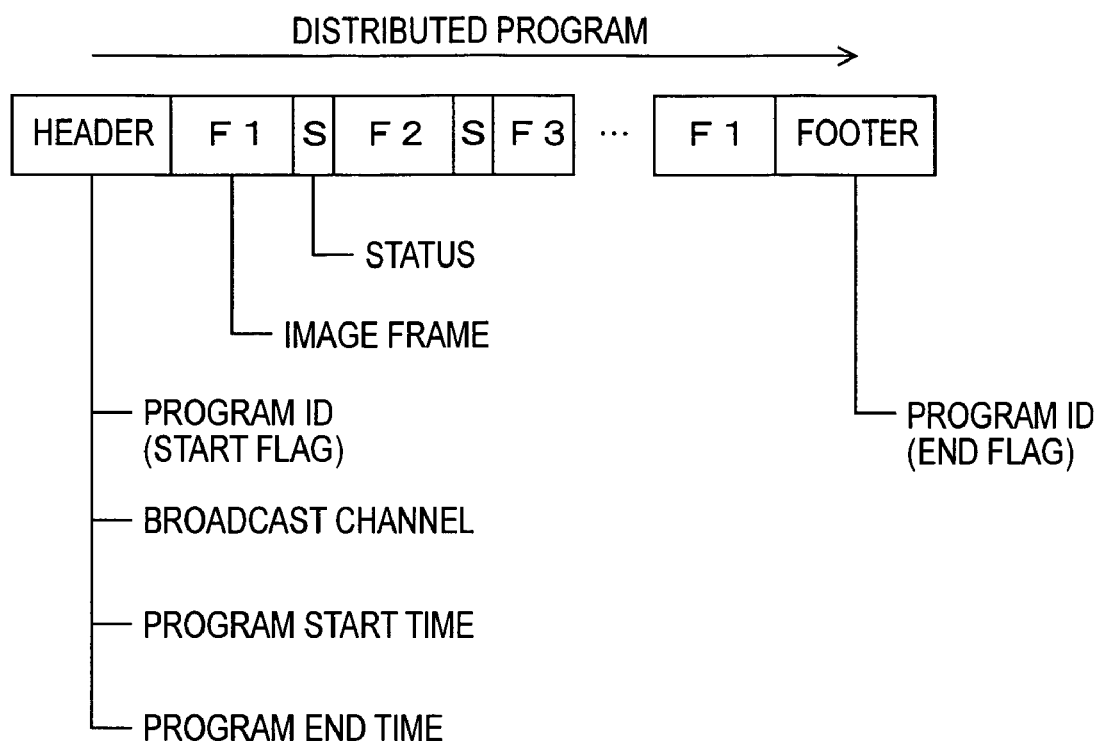
FIG. 3 is a schematic illustration showing an arrangement of a program and program identifying information provided by a program broadcasting device and a program information providing device in the embodiment.

As shown in FIG. 3, the distribution information that is output wirelessly through the carrier wave C, for instance, is a serial data including header information, frame information F1, F2 . . . , status information S and footer information, the frame information F1, F2 . . . included in the distribution information being a main part of the broadcasted program.

The header information includes information for identifying a program at the start time of the program. In the present embodiment, the header information includes a scheduled start time, a scheduled end time, etc. of the program, in addition to a program ID of the program being broadcasted and a channel broadcasting the program.

The frame information F1, F2 . . . is information forming an image frame of the broadcasted program, each frame information F1, F2 . . . having status information S added to areas of a part of front end and a part of back end.

The status information S shows whether the program being broadcasted is identical. The status changes in accordance with change in the program content, which is indicated by, for instance, Status 1 having no change in the program and Status 2 having changes.

The footer information shows that the program being broadcasted ends. By distributing the footer information, it can be recognized that the program having been broadcasted ends. In the present embodiment, the footer information includes a flag showing the end of the program being broadcasted, but the footer information may be omitted. Instead, header information of the next program may be connected, so that the end of the program can be recognized by detecting the program ID included in the header information of the next program.

Referring back to FIG. 2, in the above-described program identifying information detector 10, the program identifier detecting section 11 detects the program ID included in the header information within the program identifying information included in the carrier wave C. The status information acquirer 12 detects the status information S distributed while the program is broadcasted. The program start/end time acquirer 13 detects the scheduled start time and the scheduled end time of the program included in the header information.

Various information acquired by the program identifier detecting section 11, the status information acquirer 12 and the program start/end time acquirer 13 are output to the recording operation controller 20 of the subsequent stage.

The recording operation controller 20 is a processor including a microprocessor, which controls operation of the recording driver 30 based on the various information from the timer-recording unit 60 and the program identifying information detector 10, and records and stores the broadcasted program in the hard disk 40 as a recording medium. The recording operation controller 20 includes a recording start/end determining section 21 as a program running in the processor, a recorded program determining section 22, a recording restraining section 23, a recording interrupting section 24, a recording restarting section 25 and a set time updating section 26.

The recording start/end determining section 21 compares the program ID detected by the program identifier detecting section 11 with the program ID of the program set for timer-recording at the timer-recording unit 60 to determine whether the program is the one to be timer-recorded. The program ID of the program to be timer-recorded at the timer-recording unit 60 can be set by using a system such as EPG or set based on G-Codes listed in the newspaper or the like.

The recorded program determining section 22 determines whether the program currently being broadcasted is identical with the program to be timer-recorded based on the status information distributed between each of the frame information F1, F2 . . . , and acquired by the status information acquirer 12 while the program is being broadcasted. The determination based on the status information is performed by monitoring if the status information changes from the time the timer-recording is started by the recording start/end determining section 21.

The recording restraining section 23 restrains a recording start signal from the timer-recording unit 60 if the recording start/end determining section 21 determines that the program ID of the program to be timer-recorded has not yet been recognized even when time detected by the timer 50 is equal to the time set at the timer-recording unit 60.

The recording interrupting section 24 interrupts the program currently being recorded when the recorded program determining section 22 determines that the status information changes while the program is recorded, the interrupting section 24 interrupting the recording performed by the recording driver 30 in a pausing state.

The recording restarting section 25 brings the pausing state of the recording interrupted by the recording interrupting section 24 back to the recording state again. The recording restarting section 25 operates the recording driver 30 to restart recording when the recorded program determining section 22 determines that, after interruption, the status information is returns to the one same as the status information of the program currently being recorded.

The set time updating section 26 updates start time and end time of the program set at the timer-recording unit 60. The times are updated by the set time updating section 26 based on the program start/end time information acquired by the program start/end time acquirer.

Figure 4:
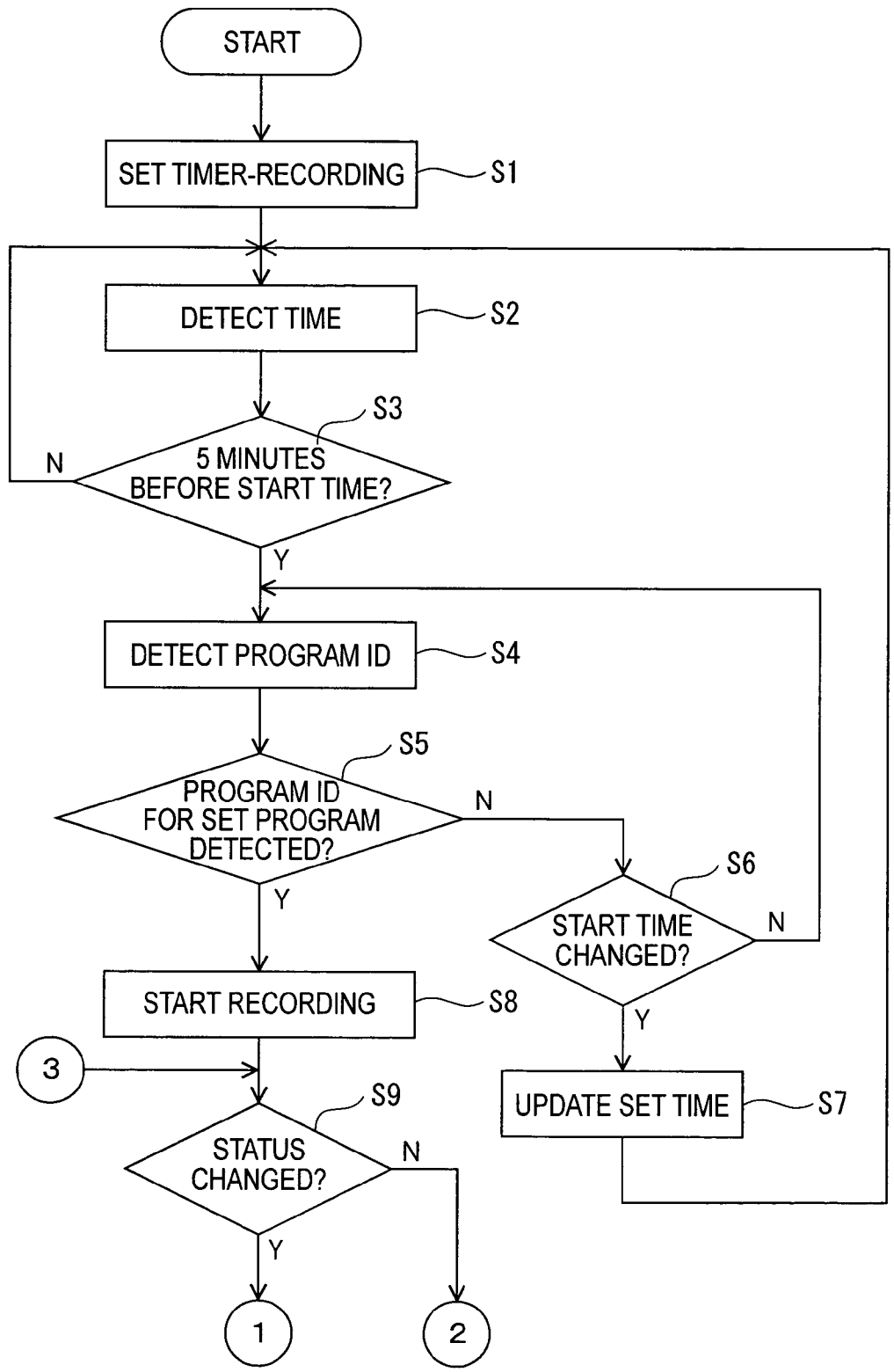
FIG. 4 is a flow chart explaining an effect of the embodiment.
Figure 5:
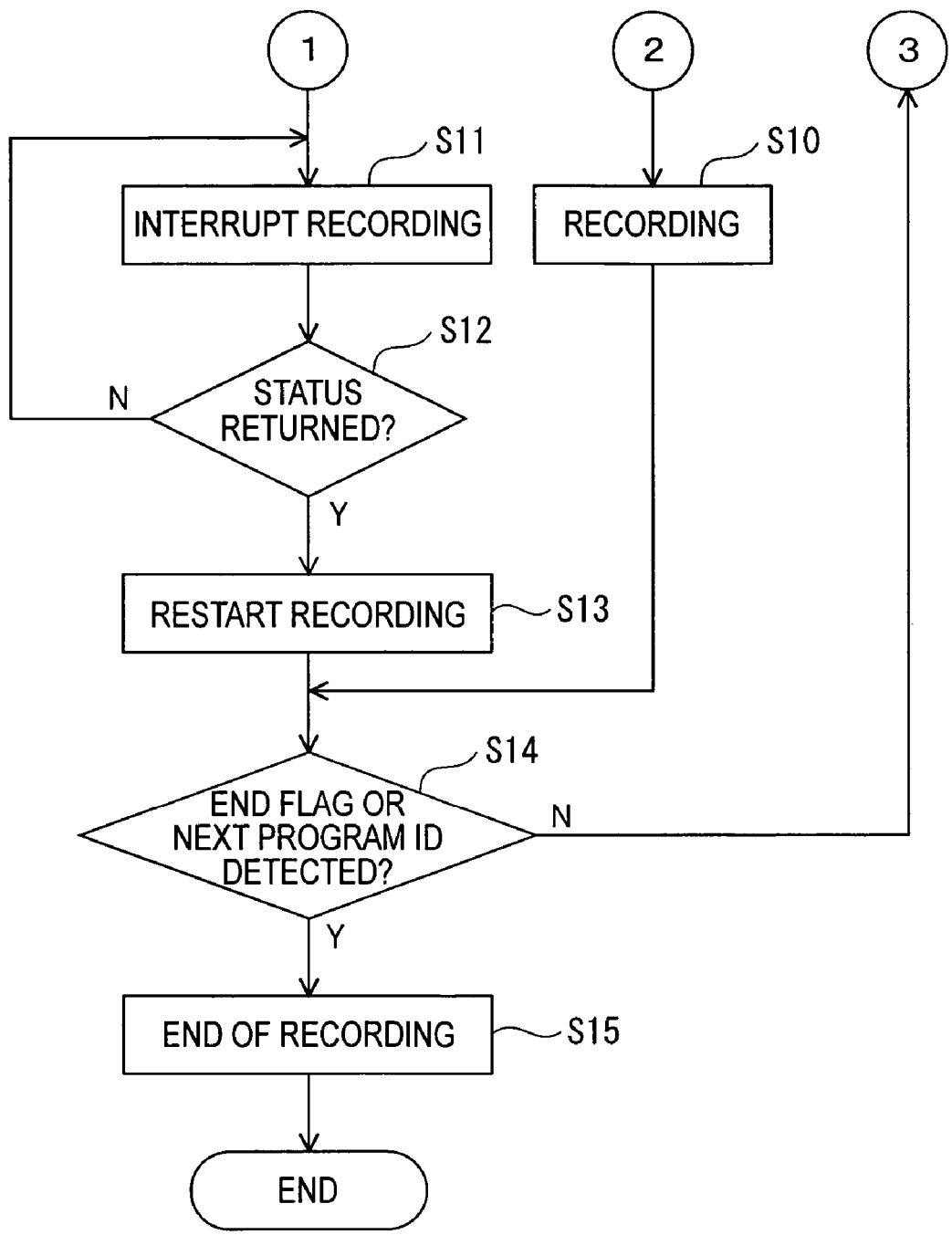
FIG. 5 is a flow chart explaining an effect of the embodiment.

Next, recording operation of the hard disk recorder 5 as a recorder according to the above-described present embodiment will be described with reference to the flow charts shown in FIGS. 4 and 5.

(1) Timer-recording is set at the timer-recording unit 60 through an operation of an operator (Step S1). Timer-recording can be set by selecting a desired program from a TV schedule in a newspaper or the like and setting the broadcast channel and time of the program, or by selecting and setting on the screen with the use of EPG.

(2) Once timer-recording is set, the timer-recording unit 60 starts comparing time detected by the timer 50 and the set time for timer-recording (Step S2).

(3) When the detected time indicates, for instance, five minutes before the set time (Step S3), the recording star/end determining section 21 outputs a control command to the program identifying information detector 10, so that the program identifier detecting section 11 starts detecting the program ID (Step S4).

(4) During the detection being performed by the program identifier detecting section 11, the recording start/end determining section 21 monitors if the program ID indicating the program to be timer-recorded is detected or not (Step S5). If the program ID is not detected by the set time for timer-recording, the recording start/end determining section 21 outputs accordingly to the recording restraining section 23, so that the recording restraining section 23 restrains the timer-recording unit 60 from starting the recording operation.

(5) The recording start/end determining section 21 then operates the program start/end time acquirer 13 to detect start and end times of the program included in the program identifying information to determine if there has been any changes in broadcast time of the program to be timer-recorded (Step S6).

(6) If the start and end times have not been changed, the recording start/end determining section 21 keeps detecting the program ID while making the recording restraining section 23 keep restraining. Although not shown in the flow charts of FIGS. 4 and 5, a setting can also be employed, where, if the program ID of the program to be timer-recorded is not detected for a predetermined period of time, the timer-recording can be canceled.

(7) If it is determined that the start and end times of the program have been changed, the set time for timer-recording set by the timer-recording unit 60 is updated by the set time updating section 26 (Step S7). After the time is updated, the step returns to Step 2 for time-detection to compare the updated set time for timer-recording and the time detected by the timer 50.

(8) On the other hand, if the program ID of the program to be timer-recorded is detected, the recording start/end determining section 21 outputs a control command to the recording driver 30, so that the recording driver 30 starts recording the program and records and stores the program in the hard disk 40. (Step S8)

(9) Once recording is started, the recorded program determining section 22 operates the status information acquirer 12 to start acquiring the status information included in the program identifying information to monitor if there are any changes in the status information (Step S9).

(10) If no change is found in the status information, the recorded program determining section 22 continues to record the program while keeping monitoring the status information. (Step S10).

(11) If a change is found in the status information, the recorded program determining section 22 determines that the program being timer-recorded is interrupted and outputs accordingly to the recording interrupting section 24. The recording interrupting section 24 then interrupts recording performed by the recording driver 30 (Step S11).

(12) During interruption, the recorded program determining section 22 keeps monitoring the status information to determine whether the status information returns or not (Step S12). If the status information does not return, then the pausing state is maintained.

(13) If the recorded program determining section 22 determines that the status information returns to the status information of the original program having been timer-recorded, the recorded program determining section 22 outputs accordingly to the recording restarting section 25, so that the recording restarting section 25 dissolves the pausing state to restart recording (Step S13).

(14) During such recording operation, the recording start/end determining section 21 determines whether an end flag in the footer information or a program ID of the next program is detected (Step S14). If not detected, the recording operation is continued.

(15) If the recording start/end determining section 21 detects the end flag or the program ID of the next program and determines that the recorded program ends, the recording operation is stopped (Step S15).

According to the present embodiment described above, following advantages can be obtained.

Since the recording operation controller 20 includes the recording start/end determining section 21 and the recorded program determining section 22, start/end of a program broadcasted by the content distributing device 1 can be determined. In addition, interruption during the program can be detected, so that the program can be accurately and completely recorded without time difference.

Since a program identifying information includes a program ID and status information, and the status information has a simple data structure including a binary signal, the status information can be mingled between image frames with extremely small amount of information. Therefore, the recording can be efficiently performed with minimum influence on image formation speed or the like of the program.

The recording operation controller 20 includes the recording interrupting section 24 and the recording restarting section 25. Thus, even if recording of the target program is interrupted by an interrupting program or the like while recording the program, the recording operation controller 20 automatically stops recording of the interrupting part of the program, and automatically restarts recording when the target program restarts, so that the program can be recorded accurately and completely.

By setting the program identifying information detector 10 so as to start detecting the program identifying information at approximately 5 minutes before the set time for the timer-recording, it is not necessary to detect the program identifying information all the time after setting the timer-recording. Therefore, electric power consumption of the hard disk recorder 5 can be saved.

Since the recording restraining section 23 is provided, if a preceding program is extended, the recording of the program set for timer-recording can be started at an actual broadcast time of the program. Therefore, the desired program can be recorded in accordance with a proper time schedule after the extension of the preceding program.

Since the set time updating section 26 is provided, even if the preceding program such as live of baseball game is greatly extended and the time schedule for broadcasting programs is greatly changed, the desired program can be securely recorded in accordance with a newly-set time schedule.

Incidentally, the scope of the present invention is not restricted to the above-described embodiments, but includes modifications and improvements as long as an object of the present invention can be achieved.

For example, in the above-described embodiment, the program and the program identifying information are distributed by one carrier wave C. Instead, the program identifying information may be distributed by using a band wavelength for distributing EPG or the like as a carrier wave, separately from the carrier wave that distributes the program. Further, the hard disk recorder may be connected to a network such as internet, so that the program identifying information may be distributed through the network. In such case, the program and the program identifying information should be synchronized.

In the above-described embodiment, the program identifying information includes the program ID and the status information, but only the program ID may be distributed as the program identifying information during broadcasting of the program, so that the program identifier detecting section 11 and the status information acquirer 12 may be combined into one. In this case, as with the change in the status information, a change in the program ID itself can be determined as a change of the program.

Specific configuration and arrangement in implementing the present invention may be designed in any manner as long as an object of the present invention can be achieved.

The priority application Number JP2004-124602 upon which this patent application is based is hereby incorporated by reference.

What is claimed is:

1. A recorder that receives a program broadcasted by a program broadcasting device for broadcasting program in accordance with a predetermined time schedule and program identifying information provided by a program identifying information providing device for providing information to identify the program broadcasted by the program broadcasting device and records the program based on the program identifying information, the recorder comprising:

a program identifying information detector for detecting the program identifying information at least at one timing of start, duration, and end of the program broadcasted by the program broadcasting device; and a recording operation controller for controlling recording operation based on a detection result of the program identifying information detector, the recording operation controller comprising:

a recording start/end determining section for starting the recording operation and/or ending the recording operation based on the detection result of the program identifying information detector; and a recorded program determining section for determining the program currently being recorded based on the detection result of the program identifying information detector while the program is recorded, wherein the program identifying information includes a program identifier showing a program broadcasted by the program broadcasting device, and status information annexed to a part of a front end or a back end of the frame information forming the program, the status information showing that the program is being broadcasted while broadcasting the program, the recording start/end determining section determines starting and/or ending of the recording operation based on the program identifier detected by the program identifying information detector, the recorded program determining section determines the program to be recorded based on the status information detected by the program identifying information detector, the recording operation controller includes a recording interrupting section for interrupting the recording operation when the recorded program determining section determines that the detected status information has been changed while the program is recorded, and a recording restarting section that restarts the recording operation when the recorded program determining section determines that the detected status information returns to the status information of the program being recorded after the recording operation is interrupted by the recording interrupting section.

2. The recorder according to claim 1, further comprising:

a timer for detecting time; and a timer-recording unit for setting broadcast time of a desired program in advance and operating the recording operation controller to start the recording operation when the time detected by the timer is equal to the broadcast time of the program, wherein the recording operation controller operates the program identifying information detector to start detecting the program identifying information when the time detected by the timer is equal to a recording start time set by the timer-recording unit, the recording operation-controller including a recording restraining section for restraining starting recording of the program when the detection result differs from the program identifier of the program to be recorded.

3. The recorder according to claim 2, wherein the program identifying information includes program start/end time information indicating the start time and/or end time of the program regarding the program identifier, the program identifying information detector includes a start/end time acquirer for acquiring the program start/end time information, and the recording operation controller includes a set time updating section for updating the time set at the timer-recording unit based on the program start/end time information acquired by the start/end time acquirer.

* * * * *